R. B. LAMB.
PROTECTOR FOR TELEGRAPH AND OTHER POLES.
APPLICATION FILED FEB. 8, 1909.
937,448.
Patented Oct. 19, 1909.
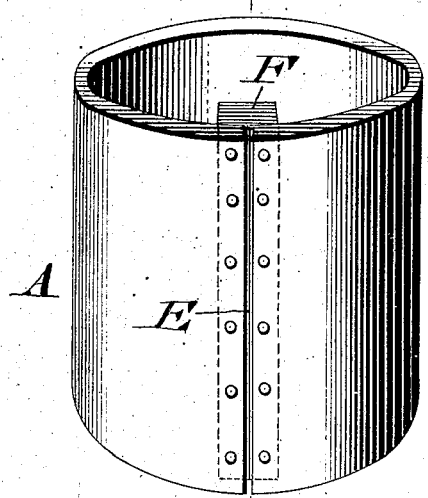
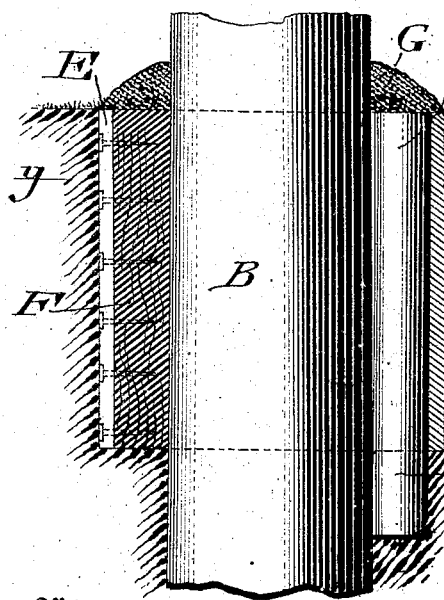
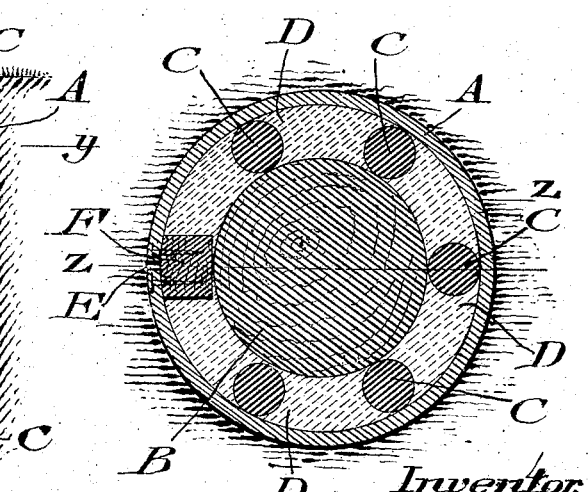

UNITED STATES PATENT OFFICE.

RESTORE B. LAMB, OF MOUNT HOLLY, NEW JERSEY.

PROTECTOR FOR TELEGRAPH AND OTHER POLES.

937,448.

Specification of Letters Patent.   Patented Oct. 19, 1909.

Application filed February 8, 1909.   Serial No. 476,698.

*To all whom it may concern:*

Be it known that I, RESTORE B. LAMB, a citizen of the United States, residing at Mount Holly, county of Burlington, State of New Jersey, have invented a new and useful Protector for Telegraph and other Poles, of which the following is a specification.

My invention consists of a device adapted to sustain and preserve the portion of a telegraph, telephone or other pole that is set in the ground, and protect the same from the influence of the earth and water thereat.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

Figure 1 represents a perspective view of a portion of a device embodying my invention. Fig. 2 represents a vertical section thereof on line $x$—$x$, Fig. 1 and line $z$—$z$, Fig. 3. Fig. 3 represents a horizontal section on line $y$—$y$, Fig. 2.

Similar letters of reference indicate corresponding parts in the figures.

Referring to the drawings:—A designates a casing or jacket which is adapted to occupy an excavation in the ground about the portion of the telegraph, telephone or other pole B below the surface of the ground, and is of greater diameter than said pole so as to receive the stakes C, which vertically occupy the casing and are driven into the ground below said excavation, whereby they surround and tighten against the adjacent portion of the pole B and serve to sustain the same in its upright position and prevent collapsing of the casing. In the existing spaces of the casing, between the stakes, there is filling D of asphalt or other suitable material which contacts with the adjacent portions of the stakes and pole and serves to protect the same from the injurious influence of the earth, water and moisture of the excavation, while also sustaining the stakes in their operative positions. The wall of the casing is divided vertically as at E, so that the casing may be readily applied around the pole prior or subsequent to the setting-up of the latter, and the walls of the division are connected by the vertical cleat F, which is located on the inside of the same and secured thereto by nails, screws or any other suitable means, said cleat also occupying the casing A and bearing against the adjacent portion of the pole B similar to the stakes C, and assisting the latter in their purposes, as most apparent in Fig. 3.

In practice, the casing A may be formed of suitable fabric saturated or impregnated with asphalt or other matter of a nature adapted to render the same ordinarily uninfluenced by earth, water, etc., and so rendered comparatively indestructible.

On the top of the casing, the filling, the stakes and cleat and surrounding the adjacent portion of the pole, is a mound formed of a mass G of cement or other material of non-inflammable nature, which prevents said parts from being ignited and burned, it also acting as a water-shed for evident purposes. It is evident that when the mound is removed, the casing may be elevated and the cleat F disconnected, when the casing may be opened and displaced from the pole for purposes requiring the same.

Having thus described my invention, what I claim as new and desire to secure by Letters Patent, is:—

1. In a protector of the character stated, a casing adapted to inclose an object to be protected, spacing stakes in said casing between the wall thereof and said object and extended beyond the bottom edge of said casing, and filling material within the casing between said stakes and around said object.

2. In a protector of the character stated, a casing adapted to inclose an object to be protected, the wall of said casing being divided vertically, and means for connecting the end-portions of the division of the casing, said means forming a spacing stake within the casing and adapted to contact with the object inclosed.

3. In a protector of the character stated, a casing adapted to inclose an object to be protected, spacing stakes within said casing around and in contact with said casing and said object, and filling material within said casing between said stakes.

4. In a protector of the character stated, a casing, the wall of which is divided vertically, means for connecting the end-portions of the division of the casing, said means constituting a spacing stake within the casing, an additional spacing stake within the casing, and filling material within said casing between said stakes and around the object to be protected.

5. In a protector of the character stated, a casing adapted to inclose an object to be protected, spacing stakes in said casing between the wall thereof and said object and contacting with said object and casing, and filling material within the casing between said stakes and around said object, and material of non-inflammable nature covering the top of the device and rising above the same.

RESTORE B. LAMB.

Witnesses:
L. S. BOYCE,
WM. W. ALLINSON.